(12) United States Patent
Qiu et al.

(10) Patent No.: US 12,179,891 B2
(45) Date of Patent: Dec. 31, 2024

(54) CAGE CULTURE PLATFORM FOR COMPREHENSIVELY UTILIZING NEW MARINE ENERGY

(71) Applicant: South China University of Technology, Guangzhou (CN)

(72) Inventors: Shouqiang Qiu, Guangzhou (CN); Qiuping Peng, Guangzhou (CN); Haibing Yang, Guangzhou (CN); Fulin Liang, Guangzhou (CN)

(73) Assignee: South China University of Technology, Guangzhou (CN)

( * ) Notice: Subject to any disclaimer, the term of this patent is extended or adjusted under 35 U.S.C. 154(b) by 0 days.

(21) Appl. No.: 18/766,886

(22) Filed: Jul. 9, 2024

(65) Prior Publication Data

US 2024/0359779 A1    Oct. 31, 2024

Related U.S. Application Data

(63) Continuation of application No. PCT/CN2022/128479, filed on Oct. 31, 2022.

(30) Foreign Application Priority Data

Jan. 13, 2022 (CN) .......................... 202210037815.1

(51) Int. Cl.
B63B 35/44 (2006.01)

(52) U.S. Cl.
CPC ...... *B63B 35/44* (2013.01); *B63B 2035/4453* (2013.01); *B63B 2035/446* (2013.01); *B63B 2035/4466* (2013.01)

(58) Field of Classification Search
CPC ............ B63B 35/44; B63B 2035/4453; B63B 2035/446; B63B 2035/4466
See application file for complete search history.

(56) References Cited

U.S. PATENT DOCUMENTS 10,716,296 B2 * 7/2020 Zheng ..................... A01K 61/10
11,149,716 B2 * 10/2021 Zheng ....................... F03D 9/25
(Continued)

FOREIGN PATENT DOCUMENTS

| CN | 201687643 U | 12/2010 |
| CN | 202756167 U | 2/2013 |

(Continued)

OTHER PUBLICATIONS

International Search Report issued in corresponding PCT Application No. PCT/CN2022/128479, dated Jan. 19, 2023.
(Continued)

*Primary Examiner* — Anthony D Wiest
(74) *Attorney, Agent, or Firm* — Pilloff Passino & Cosenza LLP; Rachel K. Pilloff; Sean A. Passino (57) ABSTRACT

A cage culture platform for comprehensively utilizing new marine energy is provided, which includes a wave power generation device, a platform main body, solar power generation devices, a wind power generation device, a culture cage and a mooring system. The wave power generation device is arranged around the platform main body, the solar power generation devices and the wind power generation device are arranged at an upper part of the platform main body, and the culture cage is arranged below the platform main body under water.

7 Claims, 7 Drawing Sheets

(56) References Cited

U.S. PATENT DOCUMENTS

| | | | |
|---|---|---|---|
| 11,412,716 | B2 | 8/2022 | Shi et al. |
| 11,555,478 | B2 | 1/2023 | Sheng et al. |
| 2024/0138039 | A1 | 4/2024 | Aoki |

FOREIGN PATENT DOCUMENTS

| | | | | |
|---|---|---|---|---|
| CN | 205242347 | A | 5/2016 | |
| CN | 107023438 | A | 8/2017 | |
| CN | 107701359 | A | 2/2018 | |
| CN | 108252263 | A | 7/2018 | |
| CN | 108374746 | A | 8/2018 | |
| CN | 111779630 | A | 10/2020 | |
| CN | 112550574 | A | 3/2021 | |
| CN | 113057130 | A | 7/2021 | |
| CN | 113120182 | A | 7/2021 | |
| CN | 114467818 | A | 5/2022 | |
| JP | 2007170282 | A | 7/2007 | |
| NO | 333299 | B1 * | 4/2013 | ............ A01K 61/60 |

OTHER PUBLICATIONS

First Office Action for China Application No. 202210037815.1, mailed Sep. 9, 2022.
Notification to Grant Patent Right for China Application No. 202210037815.1, mailed Dec. 7, 2022.
First Search Report for China Application No. 202210037815.1, dated Sep. 4, 2022.
Supplementary Report for China Application No. 202210037815.1, dated Nov. 28, 2022.

* cited by examiner

CAGE CULTURE PLATFORM FOR COMPREHENSIVELY UTILIZING NEW MARINE ENERGY

CROSS-REFERENCE TO RELATED APPLICATIONS

This application is a continuation of PCT/CN2022/128479, filed on Oct. 31, 2022, and claims priority of Chinese Patent Application No. 202210037815.1, filed on Jan. 13, 2022, the entire contents of which are incorporated herein by reference.

TECHNICAL FIELD

The disclosure belongs to the field of new marine energy and cage culture, in particular relates to a cage culture platform for comprehensively utilizing new marine energy, and in particular relates to a green intelligent cage culture platform for utilization of marine wave energy, solar energy and wind energy, integration and multi-energy complementation of source, grid, load, and storage, and flexible adaption to different sea conditions, environments and climate characteristics.

BACKGROUND

At present, under the guidance of policies such as "marine economy" and "maritime power", new marine energy development and utilization equipment and marine green cage culture equipment belong to industries strongly supported by the state. The above two kinds of equipment have different environmental requirements and working principles, so the two kinds of equipment have different structural forms and target requirements. At present, these two kinds of equipment are mostly arranged independently, and their technical maturity is not high. Especially, the new marine energy development and utilization equipment has not yet entered the stage of commercial operation, and a reliable technical scheme with unified consensus has not yet been formed, so the economic cost is high and the reliability is poor. On the other hand, although cage culture equipment has been commercialized, the technical level and added value of products are low. Most of the equipment have no power supply or are only generated by diesel engines, and there is no introduction of green energy technology. Moreover, the structure has poor ability to resist harsh sea conditions and may not be green, intelligent and large-scale. Therefore, it is urgent to upgrade the existing cage culture equipment.

At present, there are also some disclosures about marine wave energy integrated cage culture platform or breakwater, such as Chinese utility model application No. 201521092314.5 which relates to a composite breakwater with wave power generation and culture functions, and the wave power generation device in the breakwater is a vertical structure fixed on the seabed, and the volume of the air chamber of the box body may not be changed. The device may not actively collect and release the gas pressure and flow in the effective space of the box body, so the power generation efficiency is low. The device only generates electricity in the air chamber, resulting in a single power generation mode. The caisson structure is fixed on the seabed, and as a culture device, the caisson structure needs to provide additional mechanisms and power to adapt to the change of water level, resulting in high cost and poor flexibility.

SUMMARY

An objective of the disclosure is to provide a cage culture platform for comprehensively utilizing new marine energy. An oscillating-water-column wave power generation device, solar photovoltaic panels and a wind generator device are integrated into a floating platform and are optimally arranged around or in an upper space of the floating platform according to characteristics of each device, so that wave energy load and wind load are decomposed, absorbed and converted into electric energy. Moreover, an underwater space of the floating platform may be used for cage culture, and the electric energy needed for the production and life may be provided by the above power generation devices. The technical solution of the disclosure achieves the resource sharing of the main structure, anchor system, power and electrical facilities of each functional part, and the integration and multi-energy complementation of source, grid, load, and storage, expands the application scope of new marine energy devices and cage culture structures, and provides a feasible technical solution for breaking through the bottleneck of the integration and multi-energy complementation technology of marine source, grid, load, and storage.

In order to achieve the objective of the disclosure, the disclosure provides the cage culture platform for comprehensively utilizing new marine energy, which includes a platform main body, a wave power generation device, solar power generation devices, a wind power generation device, a culture cage and a mooring system. The platform main body is in a shape of triangle, rectangle, circle or other polygonal structures. The wave power generation device is arranged on a wave-facing side of the platform main body, and a connection mode of the platform main body and the wave generation device is rigid connection. The solar power generation devices and the wind power generation device are arranged in an upper space of the platform main body, and the culture cage is arranged in an underwater space of the platform main body. The wave power generation device, the solar power generation devices and the wind power generation device are all designed in a modular manner, and a number of devices may be optimally arranged according to a platform structure shape, a sea condition environment and cage culture requirements. The wave power generation device is an oscillating water column type and includes a front wallboard, a box body, an air channel, an air turbine, gearboxes or hydraulic cylinders, hydraulic motors, a coupling, a first generator and second generators, a storage battery, an optional inverter and the like. The front wallboard may generate pitching motion around a rotating shaft at a top of the front wallboard under the wave action. The rotating shaft is connected with the box body through bearings and hinge supports. Each end of the rotating shaft is connected with a corresponding one of the gearboxes or hydraulic cylinders and hydraulic motors, and the corresponding one of the gearboxes or hydraulic cylinders and hydraulic motors is connected with a corresponding one of the second generators, and the second generators are connected with the storage battery and optional inverter or electrical equipment. The top of the box body is provided with multiple circular air holes, the air channel and the air turbine are arranged at opening positions, the air turbine is connected with the first generator through the coupling. The first generator connects the output electric energy to the storage battery and the optional inverter or electric equipment. Each of the solar power generation devices includes a solar photovoltaic panel, a storage battery, the optional inverter and the like, and the storage battery and the optional inverter are connected with required electrical equipment. The wind power generation device includes a wind power generator (direct current or alternating current), a storage battery and an optional inverter or rectifier, etc., and the storage battery and the optional inverter or rectifier are connected with required electrical equipment.

Further, the wave power generation device, the solar power generation devices and the wind power generation device may share one storage battery and one optional inverter or rectifier, and the storage battery and the optional inverter or rectifier are connected with required electrical equipment.

Further, the cage culture platform for comprehensively utilizing new marine energy is anchored at the seabed by the mooring system, and a specific anchoring form is not limited under the condition of ensuring the normal work of all components of the disclosure.

Further, the top of the front wallboard is hinged to the box body, and may swing around an articulated shaft under the wave action, and an output end of the articulated shaft may also be connected with a damper to limit an excessive swing amplitude of the front wallboard so that it is limited to a certain safe movement range.

Further, the main body of the cage culture platform for comprehensively utilizing new marine energy may be provided with multiple closed chambers to be used as equipment tanks or ballast water tanks.

Further, utilization types of new marine energy attached to the cage culture platform for comprehensively utilizing new marine energy are not limited to the above-mentioned wave power generation, solar power generation and wind power generation, and may be other types of marine energy, or any one or a combination thereof.

Further, the disclosure focuses on the structural form and working principle of the device itself, and does not describe the required control actuator and sensing signal acquisition and feedback system in detail, but the disclosure has the above accessories and functions.

Further, the cage culture platform for comprehensively utilizing new marine energy may be expanded to an energy island (group) floating at sea, and may be used as an ecological culture or ecotourism sightseeing platform or a marine city or a marine airport.

Compared with the prior art, the cage culture platform integrated with various new marine energy sources provided by the disclosure may realize self-sufficiency of power for cage culture in the deep sea, and provide power for mechanization and intelligence required in culture production. Moreover, the introduction of wave power generation device may effectively reduce the motion response of the platform and provide a stable production and living environment for cage culture. Although similar disclosures have been made in the prior art for marine wave energy and structures such as cage culture or breakwater, none of the disclosures have the following characteristics of the disclosure.

Firstly, the wave power generation device according to the disclosure has a front wallboard structure that may swing longitudinally, and this structure may move with the wave peaks and valleys. This movement may dynamically adjust the volume of the air chamber, and has the ability to guide and accelerate the convergence and release of air flow in the air chamber, so the energy conversion efficiency can be improved. The rotating shaft of the swinging front wallboard can also collect energy, which further expands the energy collection mode and range of the existing air chamber and is beneficial to the output of comprehensive energy.

Secondly, the front wallboard structure that may swing longitudinally according to the disclosure is attached with a damping structure that may intelligently control the swing amplitude, and the damping structure is an generating mechanism that can obtain energy, including, for example, a gear box and a generator system, or a hydraulic motor and generator system, etc. The electric energy output may be converged with wind power generation and solar power generation panels in the upper space of the platform so as to provide power source for cage culture production.

Thirdly, the underwater space of the platform main body according to the disclosure may be used for a cage for deep-sea aquaculture, and the water platform may be equipped with power generation devices such as small fans or solar panels, and all kinds of power generation devices may be optimally arranged according to the upper space of the platform. The platform main body is a floating structure that may comprehensively utilize marine renewable energy, and may be expanded into one or more floating energy islands (groups) at sea, so as to provide a solution for achieving the goal of "carbon neutrality" and providing a clean, low-carbon, safe and efficient energy system for offshore structures.

The technical solution of the disclosure has important practical significance and popularization prospect for reducing the economic cost of the development and utilization of new marine energy devices and cage culture industry, improving the reliability and viability of devices, and expanding the industrial mode of multi-energy complementation at sea.

DETAILED DESCRIPTION OF THE EMBODIMENTS

An objective of the disclosure will be further described in detail with reference to the attached drawings and specific embodiments. It should be noted that the embodiments cannot be exhaustively detailed herein, the implementations of the disclosure are not limited to the following embodiments.

As shown in FIG. 1 to FIG. 5, the present disclosure provides a cage culture platform for comprehensively utilizing new marine energy, which includes a wave power generation device 1, a platform main body 2, solar power generation devices 3, a wind power generation device 4, a heave plate 5, a culture cage 6 and a mooring system. The wave power generation device 1 is arranged on the wave-facing side of the platform main body 2. The solar power generation devices 3 and the wind power generation device 4 are both fixedly arranged in the upper space of the platform main body 2, the culture cage 6 is located in the underwater space of the platform main body 2, and the bottom of the platform main body 2 is surrounded by the heave plate 5, which may inhibit the up-and-down movement of the platform main body 2 under the wave action, and the platform main body 2 is anchored at a predetermined position in the sea through the mooring system.

Figure 6:
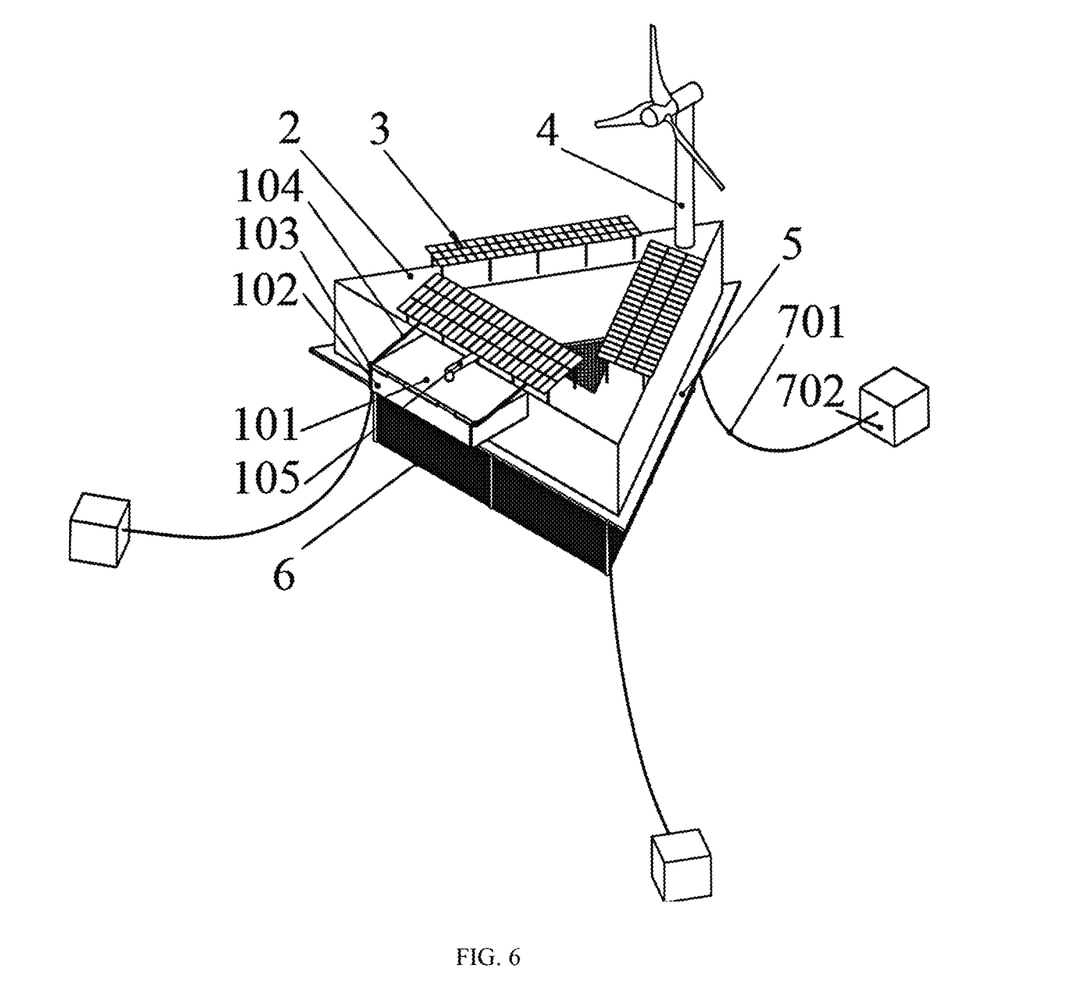
FIG. 6 is a schematic structural diagram of a cage culture platform for comprehensively utilizing new marine energy when a platform main body provided by an embodiment of the disclosure is triangular.
Figure 7:
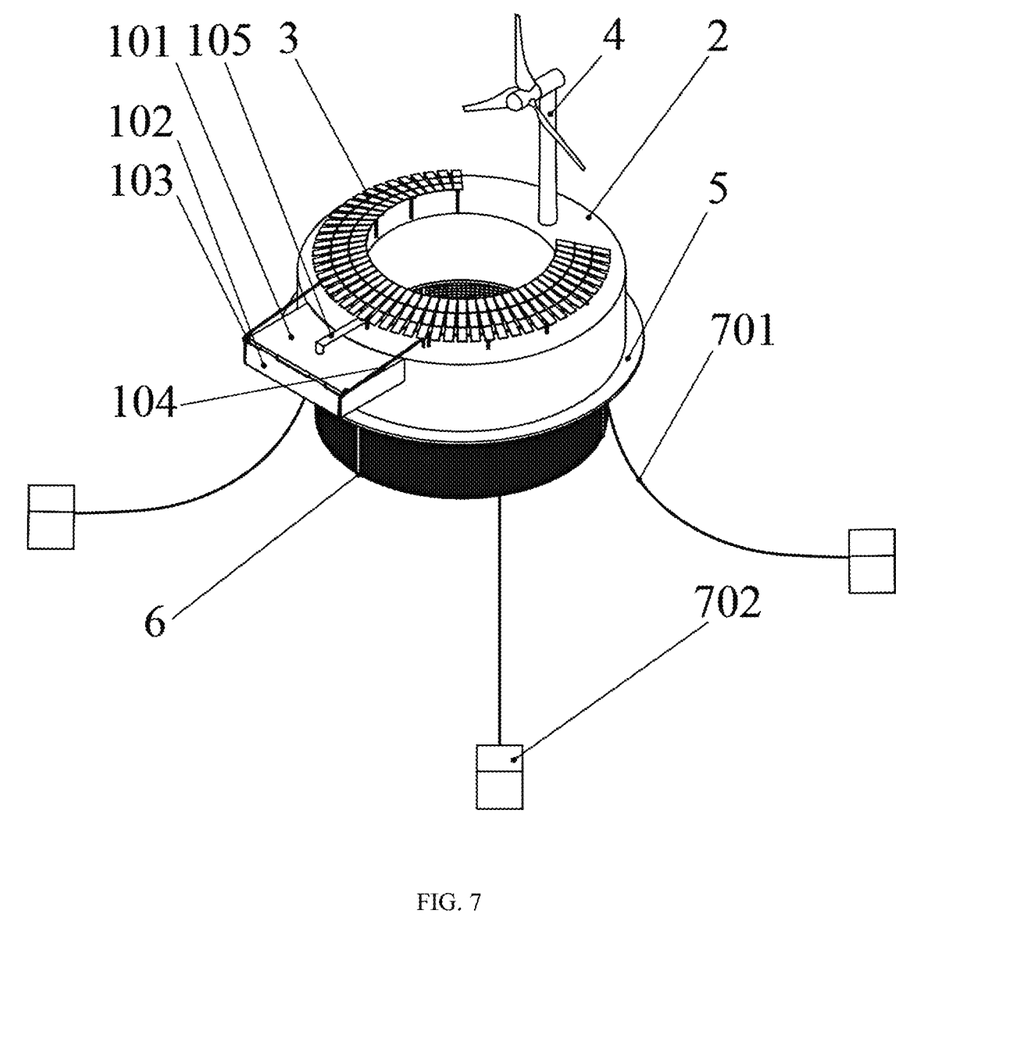
FIG. 7 is a schematic structural diagram of a cage culture platform for comprehensively utilizing new marine energy when a platform main body provided by an embodiment of the disclosure is circular.

In the disclosure, the platform main body 2 has a circular, triangular, rectangular or other polygonal shape. In some embodiments of the disclosure, as shown in FIG. 1 to FIG. 5, the platform main body 2 is a hollow rectangular platform, the wave power generation device 1 is arranged on the wave-facing side of the platform main body 2, and a connection mode between the two is rigid connection. The solar power generation devices 3 and the wind power generation device 4 are arranged in the upper space of the platform main body 2, and the culture cage 6 is arranged in the underwater space of the platform main body 2. The center of gravity of the whole platform may be reasonably arranged by the solar power generation devices 3 and the wind power generation device 4, or adjusted by a ballast water tank located in the platform main body 2. In other embodiments of the disclosure, as shown in FIG. 6, a platform main body 2 has a triangular structure, and the corresponding culture cage 6 is also triangular. The wave power generation device 1 is arranged at a center of one side, and the corresponding wind power generation device 4 may be arranged at a diagonal position of the wave power generation device 1 to balance the structural center of gravity. The mooring system uses three mooring chains, which are respectively arranged at diagonal positions at the bottom of the platform main body 2. In other embodiments of the disclosure, as shown in FIG. 7, a platform main body 2 has a circular structure, and the corresponding culture cage 6 is also circular. The box body 101 of the wave power generation device 1 is rigidly connected to the platform main body 2, and solar power generation devices 3 are uniformly distributed in the upper space of the platform main body 2 along the circumferential direction, and a portion of the upper space is reserved to arrange the wind power generation device 4, and the mooring system is uniformly distributed at bottom positions of the platform main body 2 along the circumferential direction.

Figure 2:
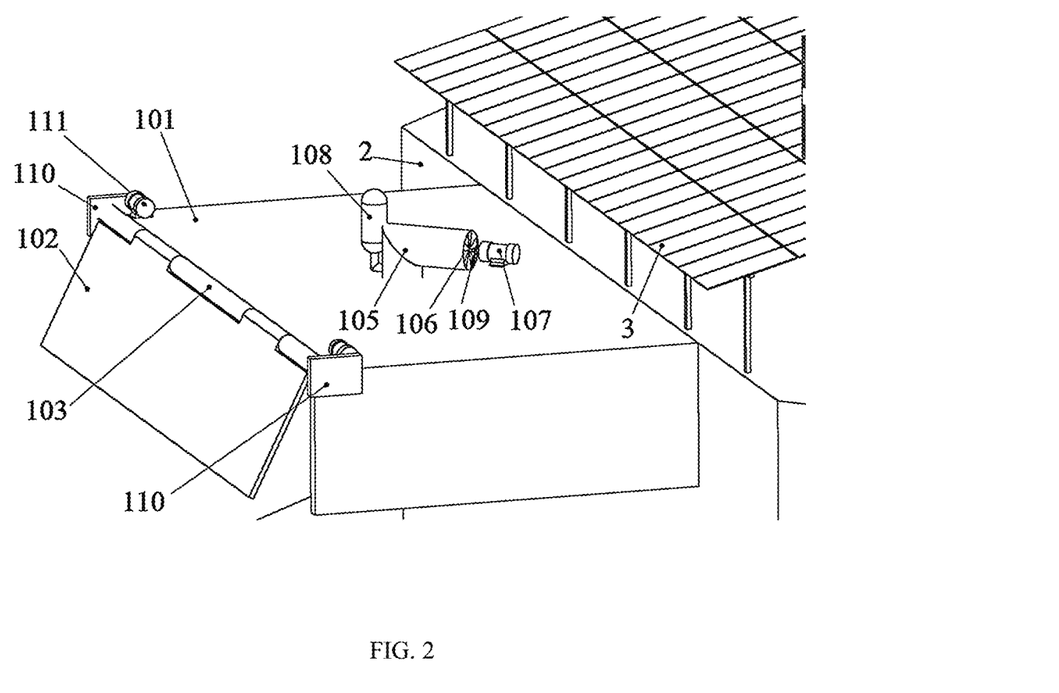
FIG. 2 is a schematic diagram of the wave power generation device of the cage culture platform for comprehensively utilizing new marine energy provided by the embodiment of the disclosure.

In some embodiments of the disclosure, as shown in FIG. 2, the wave power generation device 1 includes a box body 101, a front wallboard 102, an articulated shaft 103, an air channel 105, an air turbine 106, a first generator 107, an accumulator 108 and a coupling 109. The top end of the front wallboard 102 is hinged with one side of the box body 101 through the articulated shaft 103, and the top of the box body 101 is provided with an air hole, and the air channel 105 is in communication with the box body 101 through the air hole. The air turbine 106 is located at an air inlet-and-outlet opening of the air channel 105, and the air turbine 106 is connected with the first generator 107 through the coupling 109, and the accumulator 108 is connected with the air channel 105. The front wallboard 102 may swing back and forth around the articulated shaft 103 under the wave action. Under the wave peak action, the front wallboard 102 swings towards the inside of the box body 101 to compress the internal space of the box body 101, so that the internal air rapidly flows out from the air channel 105 located at the upper part, and the air turbine 106 at the end of the air channel 105 is impacted by the high-speed outflow air at a high speed to rotate, thereby driving the first generator 107 to rotate and output electric energy through the coupling 109. Similarly, the front wallboard 102 swings towards the outside of the box body 101 under the wave valley action to expand the internal space of the box body 101, so that external air rapidly flows in from the air channel 105 located at the upper part, and the air turbine 106 located at the end of the air channel 105 is impacted by the high-speed inflow air to rotate, and then the generator 107 is driven to rotate and output electric energy through the coupling 109. In the above process, the accumulator 108 may buffer the impact of airflow pressure on the air turbine 106, and simultaneously store and release a certain air pressure to stabilize the kinetic energy output of the air turbine.

In the disclosure, the end of the articulated shaft 103 may be connected with a damper or a second generator 111 for intelligently controlling the swing amplitude. Specifically, in some embodiments of the disclosure, as shown in FIG. 2, the wave power generation device 1 further includes second generators 111, and the articulated shaft 103 is connected with the second generator 111 through a gearbox 110. The gearbox 110 located at the end of the articulated shaft 103 and the second generator 111 connected with the gearbox 110 also rotate driven by the reciprocating swing of the front wallboard 102 and output electric energy. The gearbox 110 and the second generator 111 connected with the gearbox 110 may also apply actively control to the swing response of the front wallboard 102 by changing the load. In other embodiments, the gearbox 110 may be replaced by a hydraulic cylinder and a hydraulic motor, and the hydraulic cylinder, the hydraulic motor and the second generator 111 are connected in sequence. In another embodiment, the wave power generation device 1 is not provided with the second generators 111, but is connected with a damper at the end of the articulated shaft 103 to limit the excessive swing amplitude of the front wallboard so as to limit the front wallboard 102 to a certain safe movement range. When the second generators 111 are provided, the swing of the front wallboard 102 may be limited within the safe movement range in the process of converting the kinetic energy of the front wallboard 102 into electric energy, and there is no need to provide additional dampers.

In some embodiments of the disclosure, the second generators 111 and the first generator 107 are connected to a storage battery, and the storage battery is connected with electrical equipment required by the culture platform and an optional inverter through a controller, and the inverter is used for converting direct current into alternating current.

In some embodiments of the disclosure, the wave power generation devices 1 may be arranged around the platform main body 2 in a modular manner, that is, each wave power generation device 1 has the same structure, and multiple wave power generation devices 1 may be arranged around the platform main body 2 as required.

Figure 1:
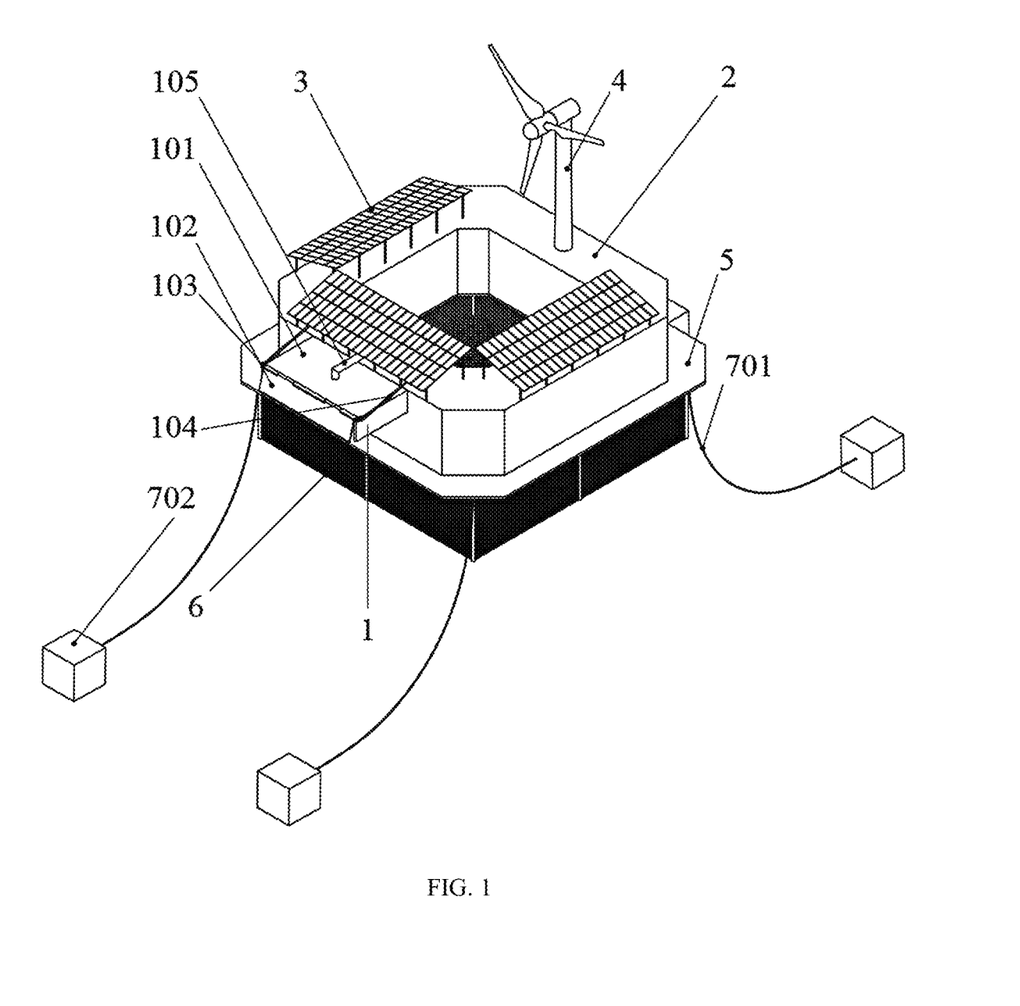
FIG. 1 is a schematic structural diagram of a cage culture platform for comprehensively utilizing new marine energy when a platform main body provided by an embodiment of the disclosure is rectangular.
Figure 3:
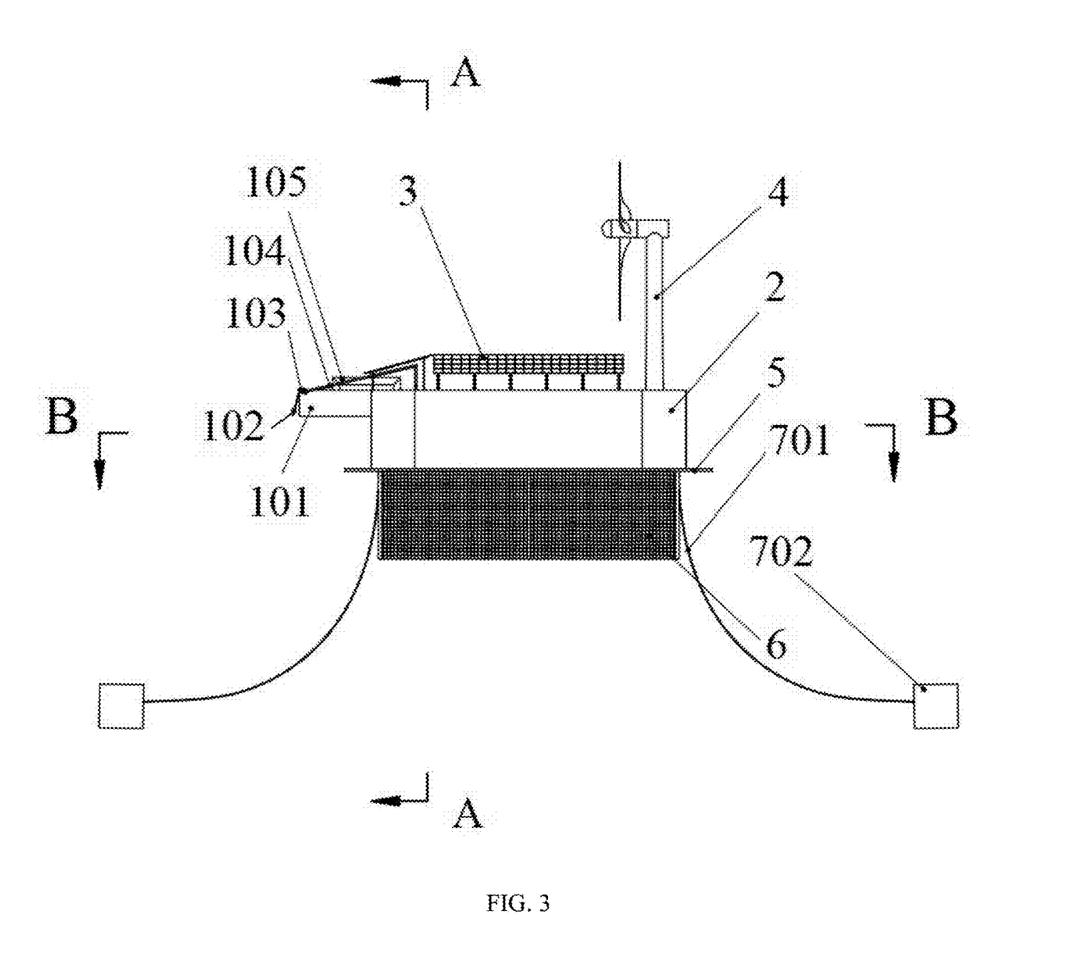
FIG. 3 is a side view of the cage culture platform for comprehensively utilizing new marine energy provided by the embodiment of the disclosure.
Figure 4:
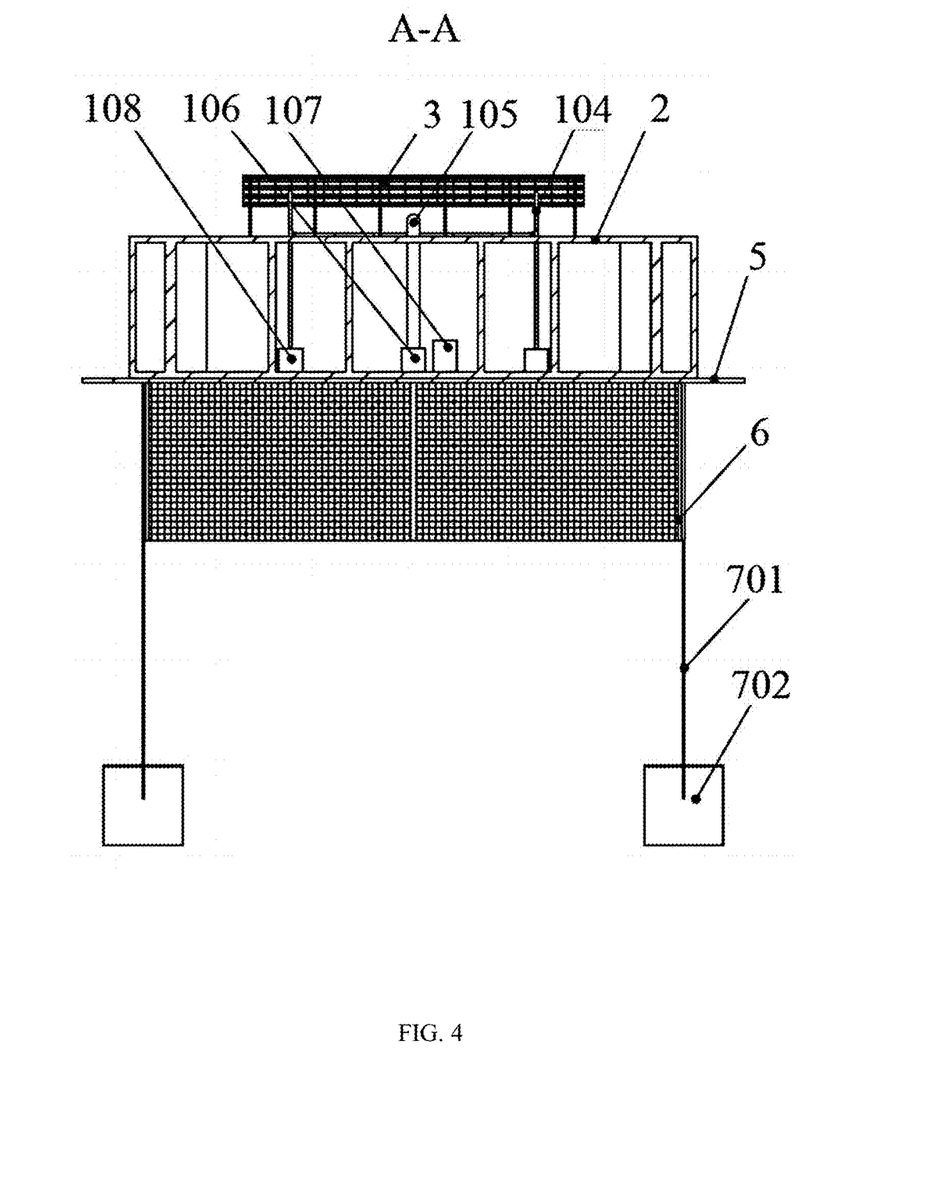
FIG. 4 is a cross-sectional view taken along line A-A in FIG. 3 of the cage culture platform for comprehensively utilizing new marine energy provided by the embodiment of the disclosure.
Figure 5:
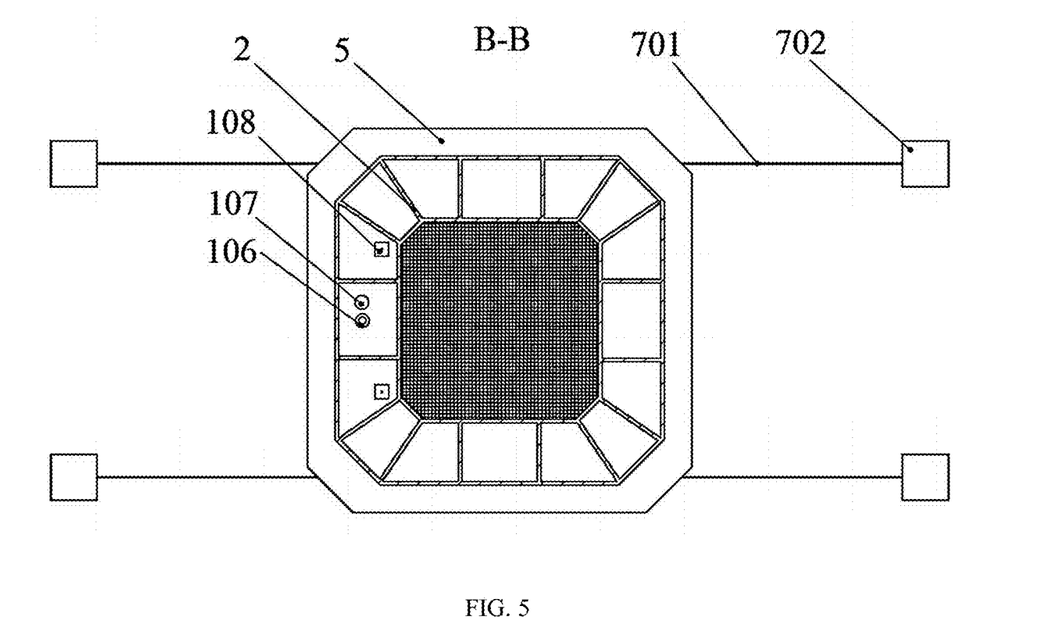
FIG. 5 is a cross-sectional view taken along the line B-B in FIG. 3 of the cage culture platform for comprehensively utilizing new marine energy provided by the embodiment of the disclosure.

In some embodiments of the disclosure, as shown in FIGS. 1, 3, 4 and 5, the interior of the platform main body 2 is divided into several scaled chambers, and sizes of the chambers may be adjusted according to the structural requirements. The components of the wave power generation device 1, including the air turbine 106, the first generator 107, the second generators 111, the accumulator 108 and the coupling 109, may all be arranged in the sealed chambers of the platform main body 2. As shown in FIG. 4 and FIG. 5, this arrangement may avoid the erosion of seawater or rainwater, greatly improve the viability of the device, and be beneficial to the maintenance of the device and reduce the maintenance cost. In addition, the platform main body 2 is also provided with the ballast water tank, which may be filled with ballast water to adjust the structural gravity center and draft to adapt to different marine environments. In this case, the output shaft of the gearbox 110 needs to transmit power to the second generator 111 in the sealed chamber through a transmission connecting rod 104, as shown in FIGS. 1, 3 and 4.

In some embodiments of the disclosure, the solar power generation device 3 includes a solar photovoltaic panel and electrical equipment thereof, and may be arranged in a modular manner in the upper space of the platform main body 2, that is, multiple solar power generation devices 3 may be arranged as required.

In some embodiments of the disclosure, the structure of the wind power generation device 4 is a horizontal axis fan or a vertical axis fan, and components include a fan and electrical equipment thereof. And the wind power generation device 4 may be arranged in a modular manner in the upper space of the platform main body 2, that is, multiple wind power generation devices 4 may be arranged as required.

In some embodiments of the disclosure, the culture cage 6 is arranged in the underwater space of the platform main body 2, and the electrical equipment required for culture may be supplied with electric energy by the wave power generation devices 1, the solar power generation devices 3 and the wind power generation devices 4.

The types of energy utilization of the disclosure are not limited to wave power generation, solar power generation and wind power generation, but may also use other types of marine energy, or any one or more combinations thereof.

In some embodiments of the disclosure, the mooring system includes counterweights 702 and multiple mooring chains 701, and the platform main body 2 is anchored at the seabed through the mooring chains 701 and the counterweights 702.

All functional components in the aforementioned embodiments of the disclosure may be consigned to a predetermined sea area after the installation at the shipyard dock, and then the floating state of the platform may be adjusted by adding water into the ballast water tank located inside the platform main body 2, and anchored at the seabed by the multiple mooring chains 701 and the counterweights 702.

It should be pointed out that any structure and motion control system thereof that may achieve the swing power generation of the front wallboard of the wave power generation device through the description of the disclosure and technical route described in the disclosure, and does not limit the structural form of the swing of the front wallboard, and does not limit the manual or automatic operation, all belong to the scope of the disclosure.

It should be noted that the power generation solutions of the disclosure are not limited to use for the cases of cage culture described in the embodiments, and all situations suitable for the power generation device module described in the disclosure belong to the protection scope of this disclosure.

The above-mentioned embodiments of the disclosure are only examples for clearly explaining the disclosure, and are not limitations to the implementation of the disclosure. For those skilled in the art, other changes or variations in different forms may be made on the basis of the above description. It is not necessary and impossible to exhaust all the embodiments here. Any modification, equivalent substitution and improvement made within the spirit and principle of the disclosure should be included in the protection scope of the claims of the disclosure.

What is claimed is:

1. A cage culture platform for comprehensively utilizing new marine energy, comprising: a wave power generation device, a platform main body, solar power generation devices, a wind power generation device, a culture cage and a mooring system;
   wherein the wave power generation device is arranged on a wave-facing side of the platform main body, the solar power generation devices and the wind power generation device are arranged in an upper space of the platform main body, the culture cage is arranged in an underwater space below the platform main body, and the mooring system is used for anchoring the platform main body in sea;
   wherein the wave power generation device comprises a box body, a front wallboard, an articulated shaft, an air channel, an air turbine, a first generator and an accumulator, wherein the front wallboard is hinged with the box body through the articulated shaft to compress or expand an internal space of the box body under an wave action, the air channel is in communication with the box body, wherein the air channel, the air turbine and the first generator are connected in sequence, and the accumulator is connected with the air channel;
   further comprising second generators, wherein each of the second generators is connected with the articulated shaft through a gearbox, or each of the second generators is connected with the articulated shaft through a hydraulic cylinder and a hydraulic motor; and
   further comprising a transmission connecting rod, wherein sealed chambers are arranged in the platform main body; the air turbine, the first generator, the accumulator and the second generators are all arranged in the sealed chambers, and an output end of the gearbox or the hydraulic cylinder and the hydraulic motor is connected with each of the second generators through the transmission connecting rod.

2. The cage culture platform for comprehensively utilizing new marine energy according to claim 1, wherein the platform main body has a circular, triangular, rectangular or other polygonal shape.

3. The cage culture platform for comprehensively utilizing new marine energy according to claim 1, further comprising a damper, wherein the damper is connected and arranged at an output end of the articulated shaft.

4. The cage culture platform for comprehensively utilizing new marine energy according to claim 1, wherein a ballast water tank is arranged inside the platform main body, and the ballast water tank is used for filling ballast water.

5. The cage culture platform for comprehensively utilizing new marine energy according to claim 1, wherein each of the solar power generation devices comprises a solar photovoltaic panel and electrical equipment thereof, and is capable of being arranged in the upper space of the platform main body in a modular manner.

6. The cage culture platform for comprehensively utilizing new marine energy according to claim 1, wherein the wind power generation device has a structural form of a horizontal axis fan or a vertical axis fan, and is capable of being arranged in the upper space of the platform main body in a modular manner.

7. The cage culture platform for comprehensively utilizing new marine energy according to claim 1, wherein types of energy utilization are not limited to wave power generation, solar power generation and wind power generation, but also use other types of marine energy, or any one or more combinations thereof.

* * * * *